No. 870,748. PATENTED NOV. 12, 1907.
O. SELG.
STIRRER FOR MASH TUBS.
APPLICATION FILED AUG. 30, 1907.

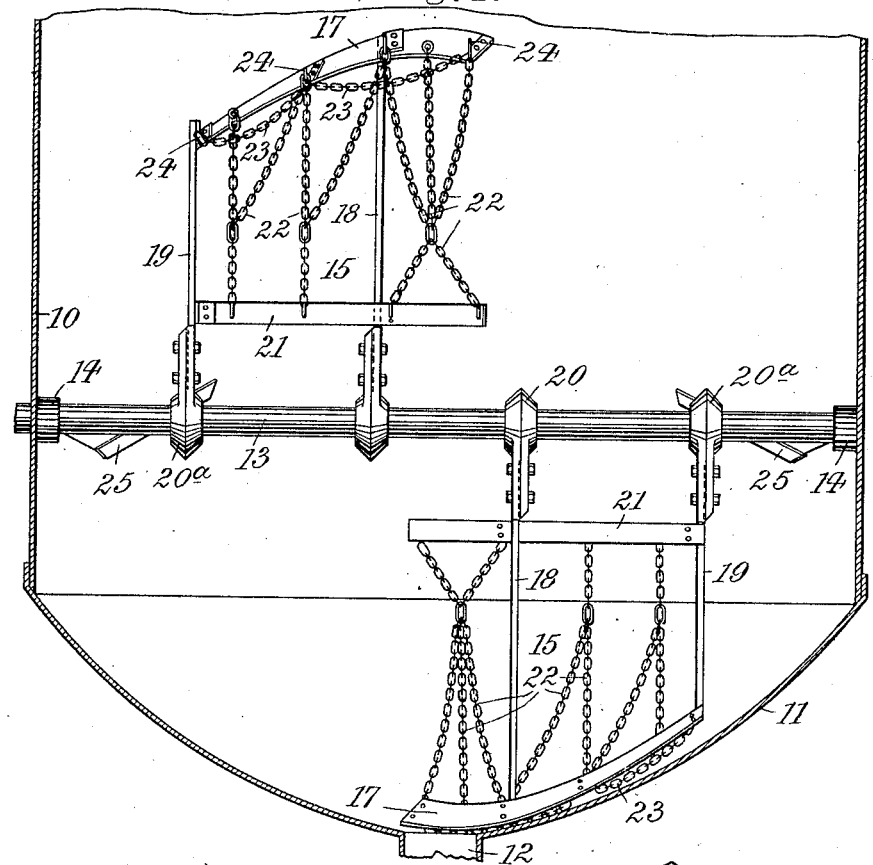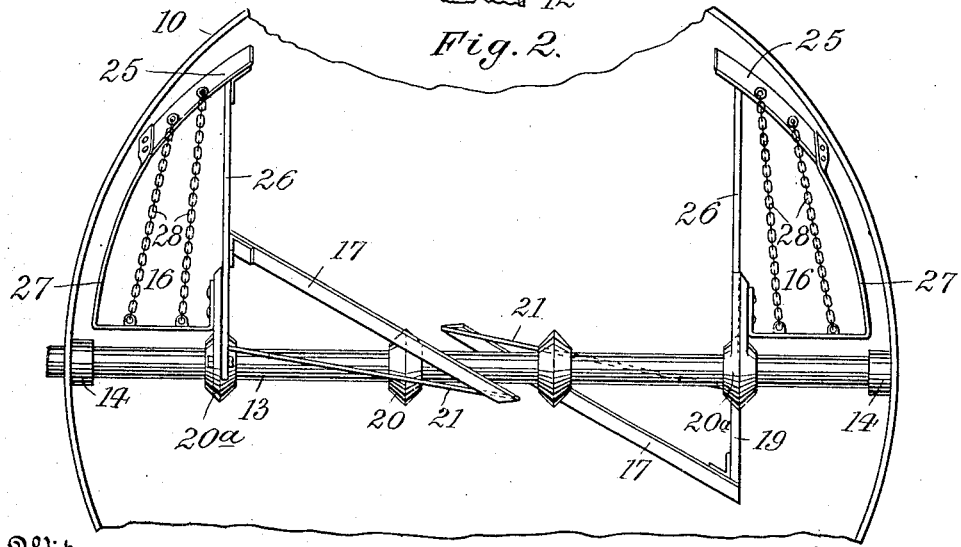

2 SHEETS—SHEET 2.

Witnesses:

Inventor
Otto Selg
By his Attorney

UNITED STATES PATENT OFFICE.

OTTO SELG, OF NEW YORK, N. Y., ASSIGNOR TO THE SELG BREWERY APPARATUS CO., A CORPORATION OF NEW YORK.

STIRRER FOR MASH-TUBS.

No. 870,748.　　　Specification of Letters Patent.　　　Patented Nov. 12, 1907.

Application filed August 30, 1907. Serial No. 390,724.

*To all whom it may concern:*

Be it known that I, OTTO SELG, a citizen of the United States, residing at New York city, Manhattan, county and State of New York, have invented new and useful Improvements in Stirrers for Mash-Tubs, of which the following is a specification.

This invention relates to an improved stirrer for mash tubs which permits the tub to be uniformly charged and effects a thorough circulation and agitation of the mash.

Figure 3:
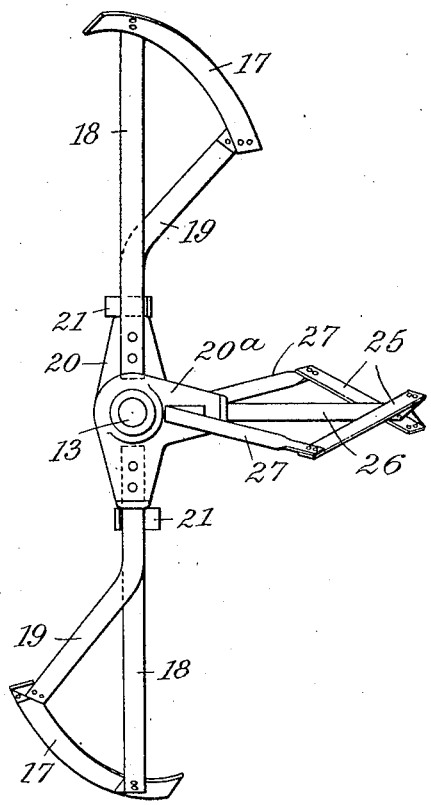
Figure 4:
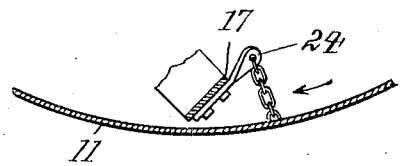

In the accompanying drawings: Figure 1 is a vertical section of the lower part of a mash tub provided with my improved stirrer; Fig. 2 a plan thereof with the chains of the central blades omitted; Fig. 3 an end view of the stirrer with the chains omitted, and Fig. 4 a detail section through the stirrer leaf.

The mash tub 10 has a curved bottom 11 provided with a central grain outlet 12. Diametrically through tub 10 extends a horizontal stirrer shaft 13 journaled in bearings 14 and rotated in suitable manner, (not shown). Shaft 13 carries a pair of open-work central stirring blades 15 and a pair of open-work end stirring blades 16. The two central blades 15 project in opposite directions from shaft 13, while the two end blades 16 project in a common direction from the shaft, blades 16 extending furthermore substantially at right angles to blades 15.

Each of the blades 15 is so constructed that it will constitute a scoop, which, while agitating the grain, will also cause it to travel from the periphery towards the center of the mash tub, thus insuring circulation. To this effect each blade 15 is provided with a leaf 17 which is curved to correspond substantially to the curvature of bottom 11. Leaf 17 is inclined or set out of plane with the axis of shaft 13 so that its outer end passes through the grain in advance of its inner end. The leaf is attached to shaft 13 by a radial inner arm 18 and a shorter bent outer arm 19, the deflection of the latter producing the desired inclination of leaf 17 to shaft 13. The attachment of leaf 17 to arms 18, 19, is such that the leaf is set at an angle to the arms, so that in this way the leaf has a rearward dip as it sweeps over bottom 11, (Fig. 4), and will thus scoop up and mix the grain with a minimum expenditure of power.

Arms 18, 19 are secured to collars 20, 20$^a$, fast on shaft 13, and carry near their inner ends a cross-bar 21 which is arranged at a less inclination to shaft 13 than leaf 17, (Fig. 2). This bar is connected to leaf 17 by a number of chains 22 which sweep through the grain on the revolution of the stirrer. In addition to chains 22, leaf 17 carries a pair of slacked chains 23 attached to eyes 24, fast on leaf 17. These eyes project a distance from the body of the leaf, so as to hold the chain off the latter and prevent its slack from being jammed between the edge of the leaf and bottom 11.

Each end blade 16 is provided with a curved and tilted leaf 25 which is inclined to shaft 13, similar to leaf 17. Leaf 25 is secured to collar 20$^a$, by a radial arm 26 and a bent arm 27 secured at its inner end to arm 26. The inner portion of arm 27 extends parallel to shaft 13 and is connected to leaf 25 by chains 28.

In use, the tub is charged with the usual mash and the stirrers are operated until all the starch has saccharified. Shaft 13 is now arrested and so set that both end blades 16 point upward, while the two central blades 15 project horizontally in opposite directions. In this way the end blades do not form obstructions which would prevent the grain from settling uniformly along the periphery of the curved bottom 11.

I claim:

1. In a device of the character described, a mash tub having a curved bottom, combined with a shaft, a pair of central blades extending therefrom in opposite directions, and a pair of end blades extending therefrom in a common direction and set at an angle to the central blades, substantially as specified.

2. In a device of the character described, a shaft, a leaf inclined out of plane with the axis of such shaft, a cross-bar, arms that secure the leaf and cross-bar to the shaft, and chains connecting said leaf and cross-bar, substantially as specified.

3. In a device of the character described, a shaft, a leaf inclined out of plane with the axis of such shaft, eyes projecting from the leaf, a first chain engaging the eyes, a cross-bar, arms that secure the leaf and cross-bar to the shaft, and second chains connecting said leaf and cross-bar, substantially as specified.

4. In a device of the character described, a mash tub having a curved bottom, combined with a shaft, a tilted curved leaf inclined out of plane with the axis of such shaft, a cross-bar, means for securing the leaf and cross-bar to the shaft, and chains connecting said leaf and cross-bar, substantially as specified.

Signed by me at New York city, (Manhattan,) N. Y., this 28th day of August, 1907.

OTTO SELG.

Witnesses:
　FRANK V. BRIESEN,
　W. R. SCHULZ.